May 13, 1930.  F. W. CLARK  1,758,596
CAR SUSPENSION SPRING DAMPER
Filed Jan. 11, 1929
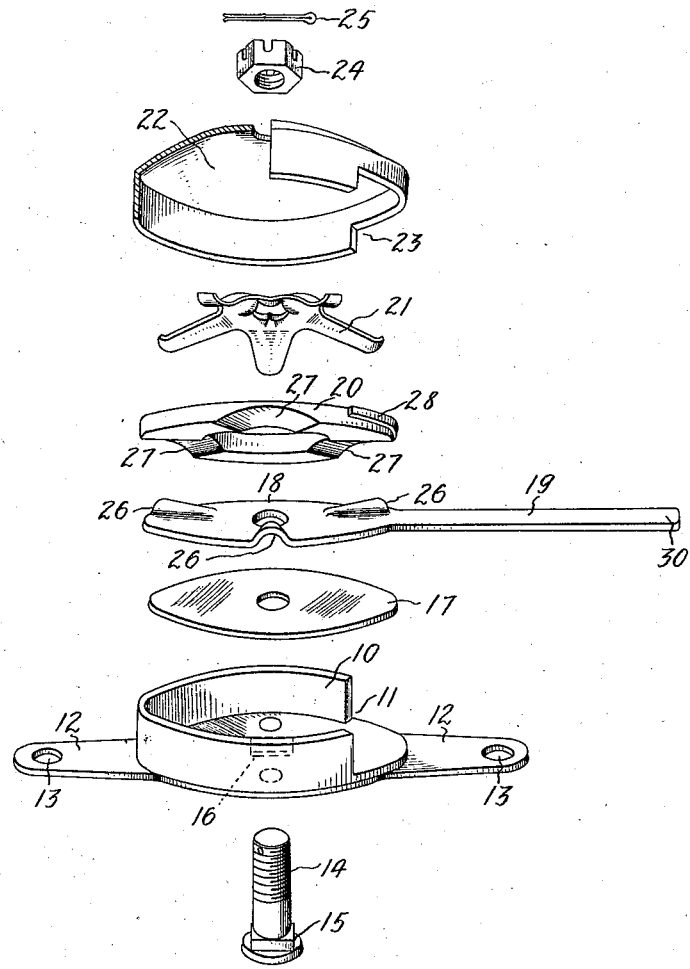
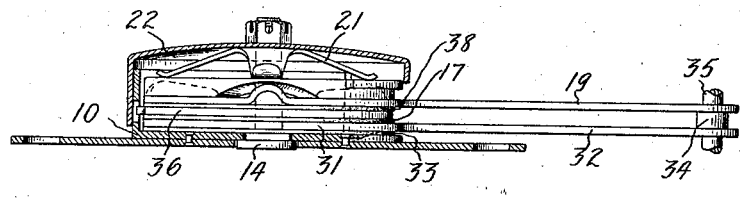

Patented May 13, 1930

1,758,596

UNITED STATES PATENT OFFICE

FREDERICK WILLIAM CLARK, OF VAUCLUSE, NEAR SYDNEY, NEW SOUTH WALES, AUSTRALIA

CAR-SUSPENSION-SPRING DAMPER

Application filed January 11, 1929, Serial No. 331,904, and in Australia January 31, 1928.

This invention relates to attachment for car suspension springs, having for their object the damping of excessive oscillatory movements which occur in travelling on irregular road surfaces. The device is characterized by extreme simplicity and ruggedness of construction and consists in a frictional braking device in which the measure of friction imposed in opposition to the spring movement is proportioned to the potential range of the spring movement, the arrangement being such that oscillatory movements of small range remain substantially uncontrolled whilst movements which would cause long range oscillation are damped proportionately to the energy of the force operating to produce them.

The device may consist of a two-member frictional element and an arm extending from each of said members; these arms are respectively terminally connected to the chassis and to the axle. Or it may consist of a like element having one member of it fixed either to the chassis or to the axle and its other member an arm and link connecting it to the other of said parts. The two members of the frictional element are rotatable relatively to each other. In the simplest arrangement the frictional device is fixed on the chassis and the operating arm is connected by a link to the axle.

The features of novelty in which the invention consists are contained in the frictional element. There is no novelty in general in a suspension spring damper consisting of two members relatively rotatable in adjustable frictional relation.

In the accompanying drawing:—

Fig. 1 is an exploded perspective view of one of these devices; and

Fig. 2 is a sectional elevational view showing a modified structure on the same principle.

Referring to Fig. 1. An open top drum 10, with a sector 11 of its side cut away, is fixed to a mounting back plate 12 which is adapted to be secured to the chassis by bolts passed through the lug holes 13 or otherwise. A centre bolt 14 with squared shoulder 15 is fitted in the drum 10, 16 being a squared hole to hold the bolt 14 against rotation. 17 is a fibre disc. 18 an arm disc, 19 an arm on said disc, 20 a cam disc, 21 a star type spring, 22 a cover cap with a sector gap 23 in the flange of it registering with the sector gap 11 in the wall of the drum 10. 24 is an adjusting castle nut which is screwed on the top of the bolt 14, and 25 is the check pin by which the nut 24 is fixed non-rotatably on the bolt 14.

One face of the disc 18 is armed with three radially disposed protuberances 26 of segmental section; there may, however, be two or four such protuberances. These protuberances register with the complementary cam faces 27 which are formed on the contacting side of the cam disc 20. A sector flange 28 is formed on the edge of the disc 20. This flange occupies the gap 11 in the drum side. The outer end 30 of the arm 19 is connected by any appropriate linkage to the axle. When the parts are assembled, the nut 24 is screwed down to impose the necessary tension on the spring 21 with the protuberances 26 located on the depressions in the cam face 27 to permit the suspension springs freedom for normal play. The cam disc 20 is non-rotatable in relation to the drum by reason of the engagement of the ends of its sector flange 28 against the ends 11 of the drum sides, but the flat disc 18 is free to rotate relatively to the drum 10 within a sufficient angular range to take care of the suspension spring movements. As the protuberances 26 move over the faces of the ramps 27 the flat disc 18 is forced laterally outward with its back face pressed more or less heavily into frictional contact with the fibre disc 17 which in turn bears frictionally on the bottom of the drum 10. The star spring 21 flexes to accommodate the lateral movement and offers resistance to that movement proportional to the degree of angular displacement of the disc 18 relatively to the drum 10. Movement of the arm 19 is thus braked and the "jump" of the axle is controlled accordingly.

In the arrangement shown in Fig. 2 an additional flat disc 31 with arm extension 32 is fitted under the fibre disc 17 and another fibre disc 33 is fixed below it. The two arms 32 and 19 which are respectively attached to those discs, are connected through a thimble 34, and the axle link is connected to the bolt 35 which passes through this thimble. 36 is a non-rotatable plate intermediate the fibre discs 17 and 38. In this arrangement the area of the frictional surface is doubled so that with a given degree of tension on the spring 21 a greater damping effect is applied to the suspension springs.

Fig. 2 serves to illustrate the assembly arrangement when read with Fig. 1. The two arrangements are identical except that in one case only one friction disc is used, and in the other case two such discs are used.

The design of this device has been developed with the object of attaining a form of construction in which all the parts may be produced as stampings from sheet steel, though in practice the ramp disc 20 may be a casting. Low cost of manufacture is thus assured, and great facility offered for regulation to obtain any desired damping effect. By substituting cam discs of different angular pitch on the faces and by varying the spring tension by means of the nut the damping characteristics of the device are adaptable for the requirements of different vehicles. Effective damping is obtainable except for very heavy vehicles with a single rotatable plate; in the case of very heavy vehicles the double plate arrangement shown in Fig. 2 is advantageous.

What I claim as my invention and desire to secure by Letters Patent is:—

1. A suspension spring damper constructed of stamped sheet steel, comprising an open top drum with slip on cover and with means adapted for fixing it to a motor chassis, a slot in the side of said drum and assembled within said drum, a disc of hard friction material, a disc with ramps on one face of it and an arm extended radially from it, and projecting through said slot and adapted to be connected to a suspension spring of a car, a cam face disc checked against rotation in the drum and having the cam depressions matching the before-mentioned disc ramps, and a star-shaped spring, with an axis bolt through the assembly and an adjusting nut on said bolt bearing on the cap above the eye of said star-shaped spring.

2. A suspension spring damper according to claim 1 having the cam faced disc checked against rotation in the drum by a protruding flange which engages in the slot in the drum side.

In testimony whereof I affix my signature.

FREDERICK WILLIAM CLARK.